United States Patent [19]
Matsuo

[11] Patent Number: 6,025,074
[45] Date of Patent: Feb. 15, 2000

[54] PRECOATING TYPE ADHESIVE COMPOSITION

[75] Inventor: Satoshi Matsuo, Tokyo, Japan

[73] Assignee: Three Bond Co., Ltd., Tokyo, Japan

[21] Appl. No.: 09/064,104

[22] Filed: Apr. 22, 1998

[51] Int. Cl.[7] .................. C09J 4/06; C09J 4/00; C08F 290/14; C08F 222/10
[52] U.S. Cl. .................. 428/402.2; 428/402.21; 428/402.22; 156/66; 156/155; 156/288
[58] Field of Search ............ 428/402.2, 402.21, 428/402.22; 156/66, 145, 155, 288

[56] References Cited

U.S. PATENT DOCUMENTS

| | | |
|---|---|---|
| 3,814,156 | 6/1974 | Bachmann et al. . |
| 4,417,028 | 11/1983 | Azevedo . |
| 5,397,812 | 3/1995 | Usami et al. ........................... 522/13 |

FOREIGN PATENT DOCUMENTS

| | | |
|---|---|---|
| 52-46339 | 11/1977 | Japan . |
| 53-11883 | 2/1978 | Japan . |
| 57-192476 | 11/1982 | Japan . |
| 2-308876 | 12/1990 | Japan . |
| 7-331187 | 12/1995 | Japan . |

OTHER PUBLICATIONS

Derwent Publications Ltd., London, GB; AN 98–434523, Abstracts of JP 10/130587 (May 1998).
Derwent Publications Ltd., London, GB; AN 96–075218, Abstract of JP 7/331187 (Dec. 1995).

*Primary Examiner*—Nathan M. Nutter
*Attorney, Agent, or Firm*—Sughrue, Mion, Zinn, Macpeak & Seas, PLLC

[57] ABSTRACT

An adhesive composition for use in precoating a screw member or the like, which comprises: (A) a suspension solution comprising a mixture of: (A1) one or more polymerization accelerator; (A2) one or more compound having at least one polymerizable double bond at a terminal thereof or in a side chain thereof; (A3) one or more acidic substance which becomes acidic after dissolved in water; and (A4) an aqueous binder which has an emulsifying capability and which is water-insolubilized by the acidic substance (A3); and (B) microcapsules containing one or more polymerization initiator. Also disclosed is a preparation process of the adhesive composition.

20 Claims, No Drawings

PRECOATING TYPE ADHESIVE COMPOSITION

FIELD OF THE INVENTION

The present invention relates to a precoating type adhesive composition which forms an adhesive layer on the spirally engaged surface of a screw member such as a screw, a bolt and a nut, to provide thread-locking function and adhesion. More particularly, the present invention relates to a liquid adhesive composition which is applied in the form of a liquid material to the spirally engaged surface of a screw member such as a screw, a bolt and a nut, to form an apparently solid layer having bonding ability.

BACKGROUND OF THE INVENTION

As a known precoating type thread-locking adhesive to be applied to the spirally engaged surface (thread) of a spiral engaging member such as a screw, a bolt and a nut, there has been heretofore known a composition composed of: an organic solvent or water as a solvent; microcapsules containing a reactive adhesive; and a binder resin, as disclosed in JP-B-52-46339 (The term "JP-B" as used herein means an "examined Japanese patent publication"), JP-A-2-308876 (The term "JP-A" as used herein means an "unexamined published Japanese patent application") and JP-A-53-11883. Further, JP-A-57-192476 discloses, as a thread-locking adhesive, an adhesive composition composed of: a polymerizable monomer; microcapsules containing a polymerization initiator; a polymerization accelerator; and an aqueous binder of an ethylene/maleic anhydride copolymer. Moreover, JP-A-7-331187 discloses, as a thread-locking adhesive, an adhesive composition composed of: a polymerizable monomer; water-resistant microcapsules containing a polymerization initiator; a polymerization accelerator; and an aqueous binder of an water-soluble polyacetal resin.

Since the precoating type adhesive compositions disclosed in these references are generally in a liquid state, the following procedure is necessary to form an adhesive layer on the spirally engaged surface of a bolt or the like:

(1) a step of applying a liquid precoating type adhesive composition to the surface of an adherend such as a bolt; and (2) a step of drying the precoating type adhesive composition thus applied, to form an apparently solid layer.

The application of a precoating type adhesive composition in the step (1) has been heretofore accomplished, for example, by spray-coating a liquid precoating type adhesive composition onto an adherend, by dipping an adherend in a liquid precoating type adhesive composition to coat the adherend with the adhesive composition, or by using a coating apparatus as described in JP-B-U-2-43504 (The term "JP-B-U" as used herein means an "eexamined Japanese utility model publication") and JP-B-U-63-4532. Further, as for the step (2), it has been a common practice to allow the coated adherend to stand at ordinary temperature so that it is naturally dried, or to heat the coated adherend to an extent such that the polymerizable adhesive does not undergo a reaction, to thereby accelerate drying.

However, among the microcapsule type adhesives which have heretofore been known, those containing a reactive agent and a reactive initiator (hardener) which are respectively microcapsulized or either of which is microcapsulized are disadvantageous in that the use of a large amount of microcapsules increases a production cost, although they exhibit an excellent storage stability as a liquid adhesive as pointed out in JP-A-7-331187. Further, since the amount of microcapsules, i.e., the amount of the reactive agent used is limited, the resulting adhesion is inadequate.

Among the microcapsule type adhesives containing a water-soluble binder, those containing an aqueous binder which readily becomes water-soluble are disadvantageous in that they require much time to dry after being applied to a bolt or the like. This reduces the productivity. In order to eliminate these difficulties, a precoating type adhesive composition is emulsified by selecting an aqueous binder which exhibits an appropriate water solubility, and thus emulsified adhesive composition is applied to an adherend, to thereby improve the drying property as disclosed in the above mentioned JP-A-5-140514. However, such a precoating type adhesive composition has a high viscosity in a liquid form and thus is disadvantageous in that it is difficult to control the amount thereof to be attached to an adherend in the case where the application is conducted by dipping the adherend in the adhesive composition. Thus, if a diluent is added to the precoating type adhesive composition to adjust the viscosity thereof, it causes problems such as a drop of adhesion, which is one of the originally intended properties of the precoating type adhesive composition. Further, although this emulsified solution of the precoating type adhesive composition forms a solid surface layer fast, water content thereof tends to remain inside as drying at the surface thereof proceeds. This requires much time for the film to dry. Moreover, a shrinkage of the formed layer accompanied with the drying produces voids inside the formed layer or deteriorates the external appearance of the formed layer.

Further, the above mentioned JP-A-57-192476 discloses, as a thread-locking adhesive, an adhesive composition composed of: a polymerizable monomer; microcapsules containing a polymerization initiator; a polymerization accelerator; and an aqueous binder of an ethylene/maleic anhydride copolymer. However, this composition also forms an emulsion state liquid matter similar to the above composition. Therefore, the water content thereof tends to remain inside the resulting solid surface layer. Moreover, there may be cases where the storage stability of the emulsified liquid comnposition itself is deteriorated, or where the reactive substance in the dried coating layer is denatured to deteriorate the adhesion.

SUMMARY OF THE INVENTION

The present invention is to solve the foregoing problems. That is, an object of the present invention is to provide a precoating type adhesive composition having good storage stability in a liquid form before applied to a bolt or the like, while maintaining its essential properties, i.e. adhesion and sealing properties. A further object is to provide an adhesive composition having good operating characteristics when applied onto an adherend such as a bolt, including providing good stability and good reactive capabilities, even after being applied to form an apparently solid coating layer.

Another object of the present invention is to provide a precoating type adhesive composition which contains components which are effective as an adhesive when applied to an adherent such as a bolt. The amount of the effective components, which may be in the form of solid matter, may be increased as much as possible, without incurring a large increase in viscosity. This gives an adhesive composition which can be easily applied to an adherend by a mass production method, such as a dip coating method.

Other objects and effects of the present invention will be apparent from the following description.

The above described objectives of the present invention have been achieved by providing:

an adhesive composition for use in precoating a screw member or the like, which comprises:

(A) a suspension solution comprising a mixture of:
- (A1) at least one polymerization accelerator;
- (A2) at least one compound having at least one polymerizable double bond at a terminal thereof or in a side chain thereof;
- (A3) at least one acidic substance which becomes acidic after dissolved in water; and
- (A4) an aqueous binder which has an emulsifying capability and which is water-insolubilized by the acidic substance (A3); and (B) microcapsules containing at least one polymerization initiator.

The present invention also relates to a preparation process of an adhesive composition for use in precoating a screw member or the like, which process comprises the steps of:

(a) providing a mixture comprising:
- (A1) at least one polymerization accelerator;
- (A2) at least one compound having at least one polymerizable double bond at a terminal thereof or in a side chain thereof; and
- (A3) at least one acidic substance which becomes acidic after dissolved in water;

(b) mixing the mixture prepared in the step (a) with (A4) an aqueous binder, which has an emulsifying capability and which is water-insolubilized by the acidic substance (A3), with stirring to effect emulsification, to thereby prepare a suspension solution containing emulsified particles each having a water-insolubilized layer formed on the surface thereof; and (c) mixing the suspension solution with microcapsules containing at least one polymerization initiator to obtain an adhesive composition.

In the above step (c), the microcapsules containing at least one polymerization initiator is added to the suspension solution to be dispersed therein. Thus, a uniform suspension solution is provided. Such a suspended structure makes it possible to restrain the viscosity of the adhesive composition at a lower value while maintaining a nonvolatile content, as compared to conventional emulsion type adhesive compositions. Therefore, the adhesive composition of the present invention enables the applied amount thereof to an adherend to be controlled.

DETAILED DESCRIPTION OF THE INVENTION

The polymerization accelerator (A1) for use in the present invention may be any known polymerization accelerator such as amine compounds and sulfimide compounds, but not limited thereto. Specific examples of the polymerization accelerator include tertiary amines such as N,N-dimethyl-p-toluidine and sulfimides such as 3-oxo-2,3-dihydrobenzisothiazole-1,1-dioxide. Of these, particularly preferred polymerization accelerators are 2-hydroxyethyl-p-toluidine, N,N-dimethyl-p-toluidine and derivatives thereof, such as N,N-dihydroxyethyl-p-toluidine, N,N-dihydroxymethyl-p-toluidine and N-ethyl-N-hydroxyethyl-p-toluidine. Further, a ferrocene compound is effective as well.

The compound containing at least one polymerizable double bond at the terminal thereof or in side chains thereof (A2) may be a compound which has heretofore been known, such as compounds containing a (meth)acryloyl group at a terminal(s) thereof or in a side chain(s) thereof. Of these, preferred compounds are those having a water solubility of not more than 10% by weight. Specific examples of these compounds include 2-ethylhexyl (meth)acrylate, 2-hydroxyethyl (meth)acrylate, dimethylaminoethyl (meth)acrylate, epoxidized bisphenol A type di(meth)acrylate, 1,3-butanediol di(meth)acrylate, ethylene glycol di(meth)acrylate, neopentyl di(meth)acrylate, trimethylolpropane tri(meth)acrylate, and polyurethane polyfunctional (meth)acrylate obtained by the reaction of diisocyanate with glycol and hydroxyalkyl (meth)acrylate. Of these, bisphenol A type (meth)acrylate is particularly preferred.

Examples of the acidic substance which becomes acidic after dissolved in water (A3) for use in the present invention include many compounds such as phosphorous acid esters and phosphoric acid esters. Specific examples of preferred acidic substances include (meth)acrylate acid phosphates containing a reactive double bond at a terminal thereof or in a side chain thereof (e.g., Light Ester PA ((meth)acrylate), available from Kyoeisha Fat Chemical Co., Ltd.; Kayamer PM-1, Kayamer PM-2 and Kayamer PM-21, available from Nippon Kayaku Co., Ltd.; and JPA-514, available from Johoku Chemical Co., Ltd.); aliphatic or aromatic carboxylic acids containing a carboxyl group at a terminal thereof and a double bond in its molecule thereof, anhydrides thereof and carboxyl group-containing (meth)acrylates (e.g., HOA-MS (2-acryloyloxyethylsuccinic acid), HOA-MPL (2-acryloyloxy ethylphthalic acid), HOA-MPE (2-acryloyloxyethyl-2-hydroxyethylphthalic acid), HO-MS (2-methacryloyloxyethyl succinic acid) and HO-MPL (2-methacryloxyethylphthalic acid), available from Kyoeisha fat Chemical Co., Ltd.; Aronix M5400, and Aronix M5500, available from Toa Gosei Chemical Industry Co., Ltd.; NK Ester A-SA (β-acryloyloxyethylhydrogen succinate) and SA (β-methacryloyloxyethylhydrogen succinate) available from Shin-nakamura Chemical Co., Ltd.); maleic anhydride; and maleic acid.

If a substance containing a double bond in its molecule is used as the acidic substance (A3), it may substitute for the whole part or an appropriate part of the polymerizable monomer (A2). However, if the acidic substance contains no double bonds in its molecule, it needs to be added in an amount such that the aqueous binder (A4) undergoes water-insolubilization to form a suspension, because bonding of spiral members such as a screw and a bolt to be hardened, which is a main intended purpose in the present invention, cannot be attained with such an acidic substance. Generally, the addition amount of the acidic substance which becomes acidic after dissolved in water (A3) may be appropriately selected as long as the intended purpose of the use of the acidic substance (A3) can be achieved, i.e., the amount is enough to water-insolubilize the aqueous binder (A4) to form a water-insolubilized layer, and thus is not particularly limited. However, the acidic substance (A3) is generally used in an amount of not more than 20% by weight based on the sum of the weights of the suspension solution (A) and the microcapsules (B). By controlling the addition amount of the acidic substance, the degree of suspension formation can be controlled. This, makes it possible to freely adjust the viscosity of the suspension thus produced. If the precoating type adhesive composition is used to be applied to an adherend such as a bolt by a dipping method, the viscosity of the adhesive composition can be adjusted with a diluent or the like for controlling the amount of the composition attached to the adherend. However, if the adhesive composition is overdiluted, it causes problems such as a drop of adhesion, which is one of the original objective of the present invention. Thus, the nonvolatile content of the adhesive composition must be maintained high. To put a standard, the suspension solution preferably has a viscosity of from 50 to 500 cps and a nonvolatile content of from 40 to 60% by weight.

Examples of the aqueous binder (A4) which comes in contact with the above-described acidic substance to produce a water-insolubilized layer include alkali metal salt of alginic acid, ammonium salt of alginic acid, alkali metal salt of pectic acid, ammonium salt of pectic acid, alkali metal salt of polyacrylic acid, ammonium salt of polyacrylic acid, alkali metal salt of polyacrylic acid ester, ammonium salt of polyacrylic acid ester, alkali metal salt of carboxymethyl (or carboxyethyl) cellulose, ammonium salt of carboxymethyl (or carboxyethyl) cellulose, and alkali metal salt of silicic acid. However, the present invention is not limited to these substances. In the present invention, these various aqueous binders may be used. Of these, particularly preferred aqueous binders are a sodium polyacrylate resin and a sodium alginate resin, which can give high adhesion to an adherend and with which a suspension is easily formed.

The aqueous binder forms a water-insolubilized layer also by the action of an ion of metal such as calcium, magnesium, iron and copper. In the present invention, any metal salt which can be dissolved in the component (A3) may be used as a source of the metal ion. Examples thereof include calcium lactate, calcium chloride, magnesium chloride, potassium carbonate, potassium phosphate, aluminum chloride, iron chloride and copper chloride.

If the water-insolubilization occurs remarkably, agglomeration tends to occur during the production of a suspension. For moderating the water-insolubilization and for causing the adhesion with respect to a specific metal, an appropriate aqueous binder different from the component (A4) may be used in combination. Specific examples of such an aqueous binder include polyvinyl alcohol and water-soluble polyacetal resin.

The polymerization initiator to be encapsulated in the microcapsules for use in the present invention may be a peroxide compound, a hydroperoxide compound, a perester compound, a peramide compound or the like. The polymerization initiator is preferably a peroxide compound, more preferably a diacyl peroxide compound. The wall material which forms the wall membrane of the microcapsules may be an aldehyde resin or a urea resin. Examples of the aldehyde resin include a urea-formaldehyde resin and a melamine/formaldehyde resin. Examples of the urea resin include a polyurea resin and a polyurethane resin. Of these, particularly preferred urea resin is a melamine resin. The grain diameter of the microcapsules is appropriately determined depending on the shape or size of the adherend to which the adhesive composition is applied. For example, in case where the adhesive composition is applied to a bolt or a nut, the grain diameter of the microcapsules can be varied within a range of from several micrometers to about 300 $\mu$m depending on the size of the thread of the bolt or the like. When a peroxide which normally stays in the form of solid grain, such as benzoyl peroxide (BPO), is used as the polymerization initiator, microcapsules having a layer formed along the powder surface can be obtained, although spherical microcapsules cannot be obtained. Since the benzoyl peroxide powder itself is difficultly soluble in water, the use thereof makes it possible to drastically enhance the preservability of the adhesive composition.

The preparation process of the precoating type adhesive composition according to the present invention is described below. In some detail, the components (A1), (A2) and (A3) are mixed beforehand. The mixture thus obtained is then mixed with the aqueous binder (A4). In this manner, the components (A1), (A2) and (A3) are temporarily emulsified with the aqueous binder (A4). Subsequently, the water-soluble acidic substance (A3) inside the emulsion grain is gradually eluted out from the interface of the grain to cause a sudden pH change and ion exchange at the interface of the grain. This allows the aqueous binder (A4) to be insolubilized in water to form a layer on the surface of the emulsion grains. The layer formation on the emulsion grain surface allows the emulsion grain to become apparently solid. Thus, a suspension solution is produced. The term "emulsion" as used herein means a liquid-liquid dispersion where a liquid medium is dispersed and emulsified in a liquid medium. The term "suspension" as used herein means a liquid-solid dispersion a solid is dispersed in a liquid medium.

The amount of the microcapsules (B) containing a polymerization initiator and the amount of the polymerization accelerator (A1) based on the addition amount of the compound containing a polymerizable double bond (A2) may be appropriately selected as long as the amounts are sufficient to polymerize and harden the compound containing a polymerizable double bond (A2). It is preferred that the microcapsules (B) containing a polymerization initiator and the polymerization accelerator (A1) be added somewhat excessively to an extent such that the stability of the compound containing a polymerizable double bond (A2) cannot be impaired. An example of preferred mixing ratio of these components is that from 30 to 50 parts by weight of the compound containing a polymerizable double bond (A2), from 10 to 30 parts by weight of the aqueous binder (A4), from 1 to 5 parts by weight of the microcapsules (B) containing a polymerization initiator, and from 0.5 to 5 parts by weight of the polymerization accelerator (A1) are mixed with 50 parts by weight of water to prepare a suspension. The effective amount of the polymerization initiator contained in the microcapsules (B) may vary depending on the kind of the material constituting the microcapsule wall or on the kind of the polymerization initiator to be encapsulated, but it is generally from 30 to 90% by weight based on the weight of the microcapsules (B).

In the present invention, various additives may be additionally used as needed. For example, when a filler is used to be added to the adhesive composition, the addition amount is appropriately selected so that the bonding properties of the adhesive composition, e.g., a force of bonding a bolt in the case where the composition is applied to a bolt, are enhanced and that the microcapsules (B) containing a polymerization initiator become easily ruptured upon fastening the bolt. The addition amount of the filler is preferably from 1 to 10 parts by weight per 100 parts by weight of the sum of the amounts of the components (A1), (A2), (A3), (A4) and (B). The kind of the filler is not particularly limited, but in order to accomplish the foregoing objects, the filler is preferably in the form of scale or acicula. The grain diameter of the filler may be adjusted to not more than 100 $\mu$m to allow the foregoing composition to be applied to a bolt or the like without causing any trouble.

The precoating type adhesive composition of the present invention may further contain a well-known polymerization inhibitor or a chelating agent to stabilize the compound containing a polymerizable double bond (A2). Specific examples of the polymerization inhibitor include hydroquinone, benzoquinone, naphthoquinone and anthraquinone. Specific examples of the chelating agent include $\beta$-diketone, ethylenediaminetetraacetic acid and sodium salt of ethylenediaminetetraacetic acid.

Furthermore, to the precoating type adhesive composition of the present invention, a plasticizer, a pigment, a dye, a diluent, an anti-foaming agent, a mildewproofing agent, a rust preventive, a pH adjustor and other additives known in the art may be added by an appropriate means to an extent such that the objectives of the present invention cannot be impaired. However, since the pH adjustor tends to affect the suspension formation and the stability of the suspension, the addition amount of the pH adjustor needs to be adjusted.

In the present invention, a colloidal silica is effectively used for keeping the stability of the suspension thus produced. This is because the addition of a colloidal silica solution (A5) after the production of a suspension causes a colloidal silica to be deposited on the surface of the suspension grains. Examples of the solvent for use in the colloidal silica solution (A5) include water. The colloidal silica once deposited can no longer be re-dispersed and thus can enhance the stability of the suspension grains.

The application process of the precoating type adhesive composition of the present invention to a bolt or the like is described below. The suspension solution thus prepared can be applied to the spirally engaged surface of a bolt or the like by means of an automatic coater or brush coater, or by dipping an adherend in a container filled with the suspension solution. The adherend coated with the suspension solution is allowed to stand at ordinary temperature or processed in a heating furnace to cause the water contents in the suspension solution to evaporate away to form an apparently dried coating on the spirally engaged portion of a bolt.

Thereafter, by fastening the bolt having an apparently dried coating on the spirally engaged portion thereof to a nut or the like, the polymerization initiator flown out from ruptured microcapsules (B) and the compound containing a polymerizable double bond (A2) oozed out from the aqueous binder (A4) undergo rapid polymerization and hardening with an aid of the polymerization accelerator (A1) to thereby fix the bolt to the nut.

The present invention will be described in greater detail with reference to the following Examples and Comparative Examples, but the invention should not be construed as being limited thereto. Prior to reference to Examples, Comparative Examples 1 to 3 will be described.

COMPARATIVE EXAMPLE 1

A precoating type adhesive composition is prepared with the following components and proportions thereof.

| Component (A1): | |
| --- | --- |
| Dimethyl-p-toluidine | 0.2 parts by weight |
| Component (A2): | |
| Bisphenol A type epoxy acrylate (BPE-4, available from Shin-nakamura Chemical Co., Ltd.) | 50 parts by weight |
| Component (A4): | |
| Water-soluble sodium polyacrylate binder (Cogum HW-7, available from Showa Highpolymer Co., Ltd.) | 10 parts by weight |
| Component (B): | |
| Microcapsules containing polymerization initiator (microcapsules: having a wall made of a melamine/formaldehyde resin; and containing 70% by weight of BPO) | 3 parts by weight |

(i) A mixture solution X of the above components (A1) and (A2) was prepared.

(ii) Then, the above component (A4) and 10 parts by weight of a water-soluble polyacetal (KW-10, available from Sekisui Chemical Co., Ltd.) were mixed with and dissolved in 30 parts by weight of water to prepare an aqueous solution Y.

(iii) The above component (B) was added to and dispersed in 25 parts by weight of water to prepare an aqueous solution Z. Then, the above described mixture X was added to the aqueous solution Y with stirring to prepare an emulsion solution. Subsequently, to this emulsion solution was added the aqueous solution Z prepared above with stirring to obtain a precoating type adhesive composition (Comparative Sample 1).

COMPARATIVE EXAMPLE 2

A precoating type adhesive composition is prepared with the following components and proportions thereof.

| Component (A1): | |
| --- | --- |
| 2-Hydroxyethyl-p-toluidine | 0.2 parts by weight |
| Component (A2): | |
| Bisphenol A type epoxy acrylate (BPE-200, available from Shinnakamura Chemical Co., Ltd.) | 50 parts by weight |
| Component (A4): | |
| Water-soluble sodium polyacrylate binder (HW-7, available from Showa Highpolymer Co., Ltd.) | 10 parts by weight |
| Component (B): | |
| Microcapsules containing polymerization initiator (microcapsules: having a wall made of melamine/formaldehyde resin; and containing 70% by weight of BPO) | 3 parts by weight |

(i) A mixture solution X of the above components (A1) and (A2) prepared.

(ii) The above component (A4) was mixed with and dissolved in 30 parts by weight of water to prepare an aqueous solution Y.

(iii) The above component (B) was added to and dispersed in 25 parts by weight of water to prepare an aqueous solution Z. Then, the above described mixture X was added to the aqueous solution Y with stirring to prepare an emulsion solution. Subsequently, to this emulsion solution was added the aqueous solution Z prepared above with stirring to obtain a precoating type adhesive composition (Comparative Sample 2).

COMPARATIVE EXAMPLE 3

A precoating type adhesive composition is prepared with the following components and proportions thereof.

| Component (A1): | |
|---|---|
| 2-Hydroxyethyl-p-toluidine | 0.2 parts by weight |
| Component (A2): | |
| Bisphenol A type epoxy acrylate (BPE-200, available from Shinnakamura Chemical Co., Ltd.) | 50 parts by weight |
| Component (A4): | |
| Water-soluble sodium alginate binder (20% aqueous solution) | 10 parts by weight |
| Component (B): | |
| Microcapsule containing polymerization initiator (microcapsules: having a wall made of a melamine/ formaldehyde resin; and containing 70% by weight of BPO) | 3 parts by weight |
| Others: | |
| Adhesion donative aqueous binder (Gosenol GM-14, available from Nippon Synthetic Chemical Industry Co., Ltd.; 4% aqueous solution) | 10 parts by weight |

(i) A mixture solution X of the above components (A1) and (A2) was prepared.

(ii) The above component (A4) and the above adhesion donative aqueous binder were mixed with and dissolved in 30 parts by weight of water to prepare an aqueous solution Y.

(iii) The above component (B) was added to and dispersed in 25 parts by weight of water to prepare an aqueous solution Z. Then, the above described mixture X was added to the aqueous solution Y with stirring to prepare an emulsion solution. Subsequently, to this emulsion solution was added the aqueous solution Z prepared above with stirring to obtain a precoating type adhesive composition (Comparative Sample 3).

The compositions (Comparative Samples 1 to 3) prepared in Comparative Examples 1 to 3 were then respectively applied to the thread portion of a zinc chromate-plated steel bolt (M (diameter) of 10 mm, P (pitch) of 1.5 mm, L (effective screw length) of 25 mm) at a coating width of from 22 to 24 mm from the top of the thread, and then dried at a temperature of 80° C. for 20 minutes to obtain precoated bolts (Comparative Examples 1 to 3).

EXAMPLE 1

A precoating type adhesive composition is prepared with the following components and proportions thereof.

| Component (A1): | |
|---|---|
| Dimethyl-p-toluidine | 0.2 parts by weight |
| Component (A2): | |
| Bisphenol A type epoxy acrylate (BPE-4, available from Shinnakamura Chemical Co., Ltd.) | 50 parts by weight |
| Component (A3): | |
| Methacrylate acid phosphate (JPA-514, available from Johoku Chemical Co., Ltd.) | 3 parts by weight |
| Component (A4): | |
| Water-soluble sodium polyacrylate binder (Cogum HW-7, available from Showa Highpolymer Co., Ltd.) | 10 parts by weight |
| Component (B): | |
| Microcapsule containing polymerization initiator (microcapsules: having a wall made of a melamine/ formaldehyde resin; and containing 70% by weight of BPO) | 3 parts by weight |

(i) A mixture solution X' of the above components (A1), (A2) and (A3) was prepared.

(ii) The above component (A4) and 10 parts by weight of a water-soluble polyacetal (KW-10, available from Sekisui Chemical Co., Ltd.) were mixed with and dissolved in 30 parts by weight of water to prepare an aqueous solution Y.

(iii) The above component (B) was added to and dispersed in 25 parts by weight of water to prepare an aqueous solution Z. Then, the above described mixture X' was gradually added to the aqueous solution Y with stirring to prepare a suspension solution. Subsequently, to this suspension solution was added the aqueous solution Z prepared above with stirring to obtain a precoating type adhesive composition (Sample 1).

EXAMPLE 2

A precoating type adhesive composition is prepared with the following components and proportions thereof.

| Component (A1): | |
|---|---|
| 2-Hydroxyethyl-p-toluidine | 0.2 parts by weight |
| Component (A2): | |
| Bisphenol A type epoxy acrylate (BPE-200, available from Shinnakamura Chemical Co., Ltd.) | 50 parts by weight |
| Component (A3): | |
| Maleic anhydride | 1 part by weight |
| Component (A4): | |
| Water-soluble sodium polyacrylate binder (HW-7, available from Showa Highpolymer Co., Ltd.) | 10 parts by weight |
| Component (B): | |
| Microcapsule containing polymerization initiator (microcapsules: having a wall made of a melamine/ formaldehyde resin; and | 3 parts by weight |

-continued

| | |
|---|---|
| containing 70% by weight of BPO) | |
| Colloidal silica: | |
| (Adelite AT-300, available from Asahi Denka Kogyo K.K.) | 10 parts by weight |

(i) A mixture solution X' of the above components (A1), (A2) and (A3) was prepared.

(ii) The above component (A4) was mixed with and dissolved in 30 parts by weight of water to prepare an aqueous solution Y.

(iii) The above component (B) was added to and dispersed in 25 parts by weight of water to prepare an aqueous solution Z. Then, the above described mixture X' was gradually added to the aqueous solution Y with stirring to prepare a suspension solution. Subsequently, to this suspension solution was added 10 parts by weight of the above shown colloidal silica with stirring. To the resulting mixture was then added the aqueous solution Z prepared above with stirring to obtain a precoating type adhesive composition (Sample 2).

EXAMPLE 3

A precoating type adhesive composition is prepared with the following components and proportions thereof.

| | |
|---|---|
| Component (A1): | |
| 2-Hydroxyethyl-p-toluidine | 0.2 parts by weight |
| Component (A2): | |
| Bisphenol A type epoxy acrylate (BPE-200, available from Shinnakamura Chemical Co., Ltd.) | 50 parts by weight |
| Component (A3): | |
| Methacrylate phosphate acid (Kayamer PM-1, available from Nippon Kayaku Co., Ltd.) | 1 part by weight |
| Component (A4): | |
| Water-soluble sodium alginate binder (20% aqueous solution) | 10 parts by weight |
| Component (B): | |
| Microcapsule containing polymerization initiator (microcapsules: having a wall made of a melamine/ formaldehyde resin; and containing 70% by weight of BPO) | 3 parts by weight |
| Colloidal silica: | |
| (Adelite AT-300, available from Asahi Denka Kogyo K.K.) | 10 parts by weight |

(i) A mixture solution X' of the above components (A1), (A2) and (A3) was prepared.

(ii) The above component (A4) was mixed with and dissolved in 30 parts by weight of water to prepare an aqueous solution Y.

(iii) The above component (B) was added to and dispersed in 25 parts by weight of water to prepare an aqueous solution Z. Then, the above described mixture X' was gradually added to the aqueous solution Y with stirring to prepare a suspension solution. Subsequently, to this suspension solution was added 10 parts by weight of the above shown colloidal silica with stirring. To the mixture was then added the aqueous solution Z prepared above with stirring to obtain a precoating type adhesive composition (Sample 3).

The compositions (Samples 1 to 3) prepared in Examples 1 to 3 were then respectively applied to the thread portion of a zinc chromate-plated steel bolt (M (diameter) of 10 mm, P (pitch) of 1.5 mm, L (effective screw length) of 25 mm) at a coating width of from 22 to 24 mm from the top of the thread, and then dried at a temperature of 80° C. for 20 minutes to obtain precoated bolts (Examples 1 to 3).

The compositions and precoated bolts obtained in Comparative Examples 1 to 3 and Examples 1 to 3 were evaluated for the following properties. The results are set forth in Table 1.

TABLE 1

| | Comparative Example 1 | Comparative Example 2 | Comparative Example 3 | Example 1 | Example 2 | Example 3 |
|---|---|---|---|---|---|---|
| Nonvolatile content (110° C., 2 hr) | 45% | —[1)] | — | 45% | — | — |
| Viscosity 1 (BL, 60 rpm) | 6,250 | 3,500 | 2,500 | 358 | 220 | 190 |
| Viscosity 2 (BL, 6 rpm) | 7,600 | 4,800 | 3,000 | 420 | 240 | 210 |
| Thixotropic ratio (the ratio of viscosity 1/viscosity 2) | 1.22 | 1.37 | 1.20 | 1.17 | 1.09 | 1.10 |
| Breaking torque[2)] (fastened at 300 kgf · cm, | 375 | 390 | 350 | 370 | 380 | 360 |

TABLE 1-continued

|  | Comparative Example 1 | Comparative Example 2 | Comparative Example 3 | Example 1 | Example 2 | Example 3 |
| --- | --- | --- | --- | --- | --- | --- |
| hardened for 24 hr) | | | | | | |

Note:
1)The symbol "—" indicates unmeasured.
2)Averaged value over 5 times

Determination of Nonvolatile Content and Viscosity:

Comparative Samples 1 to 3 and Samples 1 to 3 were measured for nonvolatile content (110° C., 2 hrs.) and viscosity (cps) by means of a BL viscometer (at 60 rpm and at 6 rpm) to determine their structural viscosity ratio.

Torque Test:

The precoated bolts obtained were each fitted with and fastened to a nut at 300 kgf.cm, allowed to stand for 24 hours, and the breaking torque upon unfastening was measured.

As for Comparative Sample 1 and Sample 1, the respective composition prior to mixing with the component (B) was examined for the formation of a suspension by a scanning electron microphotograph and for the fluidity characteristics by a rheometer. The examination of the suspension formation by a scanning electron microphotograph was conducted as follows. Comparative Sample 1 and Sample 1 were each diluted 50 times with purified water to obtain a solution, which was then instantly frozen. The solution thus frozen was metallized with gold, and an SEM photograph of the thus prepared specimen frozen at a solution state was taken to observe the state of a suspension.

Formation of Suspension:

Comparative Sample 1 was observed having a frozen resin distributed like cobwebs around oil droplets and a monomer dispersed as an oil droplet by the action of surface activity of the aqueous binder. Thus, it was found that the sample has a resin distributed around oil droplets in the form of liquid emulsion. On the other hand, Sample 1 had an aqueous binder formed as a water-insolubilized film on the surface of oil droplets. Thus, core-shell type oil droplets which act as solid were formed. Further, only water was present around the oil droplets, demonstrating that the oil droplets are sufficiently kept suspended. This shows that water can be readily evaporated away during drying.

Results of Measurement by Rheometer:

It was confirmed that when measured at a shear rate falling below the measurement range by BL viscometer, Sample 1 shows an increased viscosity that makes it difficult for itself to drip. When measured at a shear rate of $\frac{1}{10}$ to 100 $sec^{-1}$, which is optimum for coating, Sample 1 shows a low viscosity so as to be easily applied to an adherend. The sample dipping-coated onto an adherend exhibits a high stationary viscosity so as to prevent itself from dripping. On the other hand, Comparative Sample 1 was diluted with water to adjust its viscosity almost equal to that of Sample 1, and then measured by a rheometer. However, the sample shows no considerable stationary viscosity increase even at a reduced shear rate. It was thus confirmed that this sample easily drips.

The bolts obtained in Example 1 and Comparative Example 2 were observed for external appearance of the formed coatings by a projector. As a result, the bolt of Example 1 was observed to have a uniform smooth coated layer formed on the surface thereof to a sufficient thickness. On the contrary, the bolt of Comparative Example 1 was observed to have a reduced film thickness due to shortage of the solid content that causes the generation of crinkles on the coated layer surface.

In accordance with the present invention, the use of a suspension system having a solid substance dispersed in a liquid medium makes it possible to obtain a precoating type adhesive having a high nonvolatile content and a reduced viscosity suitable for dipping coating. The use of such a suspension system provides a precoating type adhesive composition which exhibits an enhanced internal drying ability during drying after applied to an adherend. Further, after dried, a precoated thread-locking screw member thus obtained can be stored over a long period of time.

Further, the use of the suspension system makes it possible to give a higher nonvolatile content of the resulting adhesive composition while restraining the viscosity thereof at a lower value, as compared to emulsion systems. Due to its fluidity, the suspension solution has a low viscosity and thus can be easily applied to an adherend by a dipping method. When the adherend is withdrawn from the suspension solution, the suspension solution can difficultly drip. Further, the use of the suspension system makes it possible to suppress surface drying and to enhance internal drying ability. Thus, a coated layer can be formed in conformity with the valley-shape of a screw without impairing the external appearance.

Prior to use, the component (A) is generally mixed with about 1 to 5% of the microcapsules (B) containing a polymerization initiator. The adhesive composition thus prepared is applied to a bolt, and then dried. Because of its suspension form, the adhesive composition can hardly drip and thus can provide an improved external appearance after dried. Further, since the emulsion grains are apparently solid and an aqueous binder which is inherently dissolved in the solution forms a layer on the surface of the emulsion grains, the solution excluding the emulsion grains has no aqueous binder dissolved therein. Therefore, water can easily be evaporated away from inside the adhesive composition, and the adhesive composition is less apt to dry at the surface thereof. Thus, the adhesive composition of the present invention has excellent drying characteristics suitable for mass-productivity. In addition, in accordance with the present invention, a coating layer formed with the adhesive composition has a state in which the monomers or oligomers are somewhat isolated even after dried. Therefore, the composition applied to a bolt or the like has an extremely high stability and hence making it possible to store the precoated bolt over a long period of time.

As mentioned above, the conversion of a liquid state to a suspension makes it possible to provide an adhesion composition having an increased concentration and a reduced viscosity. This improves dipping-coating characteristics of the adhesive composition and gives a dried layer having an improved external appearance. Thus, the adhesive composition thus prepared exhibits an improved drying ability and productivity. Furthermore, by forming a water-insolubilized layer, emulsified grains stay at liquid state which can be stored over a long period of time even in a system containing a polymerization initiator.

While the invention has been described in detail and with reference to specific examples thereof, it will be apparent to one skilled in the art that various changes and modifications can be made therein without departing from the spirit and scope thereof.

What is claimed is:

1. An adhesive composition for use in precoating a threaded fastener, which comprises:

(A) a suspension comprising a mixture of:
  (A1) at least one polymerization accelerator;
  (A2) at least one monomer having at least one polymerizable double bond at a terminal thereof or in a side chain thereof;
  (A3) at least one substance which becomes acidic when dissolved in water selected from the soup consisting of a phosphorus acid ester, a phosphoric acid ester, an aliphatic or aromatic carboxylic acid containing a carboxyl group at a terminal thereof and having a double bond in its molecule, an anhydride of an aliphatic or aromatic carboxylic acid containing a carboxyl group at a terminal thereof and having a double bond in its molecule, a carboxyl group-containing (meth)acrylate, a maleic anhydride and a maleic acid; and
  (A4) an aqueous binder which is water-solubilized by alkali salting, has an emulsifying capability and which, due to the presence of said at least one substance (A3), produces a water-insoluble layer to form the particle portion of the suspension; and (B) microcapsules containing at least one polymerization initiator.

2. The adhesive composition according to claim 1, wherein said monomer (A2) comprises a monomer having a water-solubility of not more than 10% by weight.

3. The adhesive composition according to claim 2, wherein said monomer having a water-solubility of not more than 10% by weight is a bisphenol A type (meth)acrylate.

4. The adhesion composition according to claim 1, wherein said substance (A3) which becomes acidic when dissolved in water comprises (meth)acrylate acid phosphate.

5. The adhesive composition according to claim 1, wherein said substance (A3) which becomes acidic when dissolved in water comprises at least one compound selected from the group consisting of:
  (a) an aliphatic carboxylic acid terminated by a carboxylic group and having a polymerizable double bond in its molecule;
  (b) an aromatic carboxylic acid terminated by a carboxylic group and having a polymerizable double bond in its molecule; and
  (c) a carboxyl group-containing (meth)acrylate.

6. The adhesive composition according to claim 1, wherein said polymerization accelerator (A1) comprises a tertiary amine.

7. The adhesive composition according to claim 1, wherein said polymerization accelerator (A1) comprises a modified dimethyl-p-toluidine.

8. The adhesive composition according to claim 1, wherein the wall of said microcapsules (B) comprises a water resistant melamine resin.

9. The adhesive composition according to claim 1, wherein said polymerization initiator contained in said microcapsules (B) comprises a solid diacyl peroxide.

10. The adhesive composition according to claim 1, wherein said suspension (A) has a viscosity of from 50 to 500 cps and an nonvolatile content of from 40 to 60% by weight.

11. The adhesive composition according to claim 1, wherein said mixture constituting said suspension (A) further comprises (A5) a colloidal silica solution.

12. The adhesion composition according to claim 1, wherein said aqueous binder (A4) comprises at least one binder selected from the group consisting of an alkali metal salt of alginic acid, an ammonium salt of alginic acid, an alkali metal salt of pectic acid, an ammonium salt of pectic acid, an alkali metal salt of polyacrylic acid, an ammonium salt of polyacrylic acid, an alkali metal salt of polyacrylic acid ester, an ammonium salt of polyacrylic acid ester, an alkali metal salt of carboxymethyl cellulose, an alkali metal salt of carboxyethyl cellulose, an ammonium salt of carboxymethyl cellulose, an ammonium salt of carboxyethyl cellulose, and an alkali metal salt of silicic acid.

13. The adhesive composition according to claim 12, wherein said aqueous binder (A4) is a sodium polyacrylate resin or a sodium alginate resin.

14. A process for preparing an adhesive composition for use in precoating a threaded fastener comprising the steps of:
  (a) providing a mixture comprising:
    (A1) at least one polymerization accelerator;
    (A2) at least one monomer having at least one polymerizable double bond at a terminal thereof or in a side chain thereof;
    (A3) at least one substance which becomes acidic when dissolved in water; and
  (b) adding to said mixture provided in step (a) an aqueous binder (A4) with stirring to effect emulsification to form particles,
  (c) allowing said at least one substance (A3) to contact with said aqueous binder (A4) to cause a sudden pH change and/or ion exchange at the interface thereof to cause said aqueous binder (A4) to become water insoluble to thereby produce a suspension containing emulsified particles each having a water-insoluble layer formed on the surface thereof; and
  (d) mixing said suspension with microcapsules containing at least one polymerization initiator to obtain an adhesive composition.

15. The preparation process according to claim 14, further comprising a step of adding (A5) a colloidal silica solution to said suspension prepared in the step (b) to coat said water-insoluble layer surface therewith.

16. The preparation process according to claim 14, wherein said water-insolubilization of said aqueous binder (A4) is caused by ion-exchange with said substance which becomes acidic when dissolved in water.

17. The preparation process according to claim 14, wherein said substance which becomes acidic when dissolved in water (A3) is selected from the group consisting of a phosphorus acid ester, a phosphoric acid ester, an aliphatic or aromatic carboxylic acid containing a carboxyl group at a terminal thereof and having a double bond in its molecule, an anhydride of an aliphatic or aromatic carboxylic acid containing a carboxyl group at a terminal thereof and having a double bond in its molecule, a carboxyl group-containing (meth)acrylate, a maleic anhydride and a maleic acid.

18. The preparation process according to claim 14, wherein said aqueous binder (A4) comprises at least one binder selected from the group consisting of an alkali metal salt of alginic acid, an ammonium salt of alginic acid, an alkali metal salt of pectic acid, an ammonium salt of pectic acid, an alkali metal salt of polyacrylic acid, an ammonium salt of polyacrylic acid, an alkali metal salt of polyacrylic acid ester, an ammonium salt of polyacrylic acid ester, an alkali metal salt of carboxymethyl cellulose, an alkali metal salt of carboxyethyl cellulose, an ammonium salt of carboxymethyl cellulose, an ammonium salt of carboxyethyl cellulose, and an alkali metal salt of silicic acid.

19. The preparation process according to claim 18, wherein said aqueous binder (A4) is a sodium polyacrylate resin or a sodium alginate resin.

20. The preparation process according to claim 14, wherein said substance which becomes acidic when dissolved in water (A3) comprises (meth)acrylate acid phosphate.

* * * * *